(12) United States Patent
Blaschke

(10) Patent No.: US 10,571,119 B2
(45) Date of Patent: Feb. 25, 2020

(54) COMBUSTION CHAMBER ASSEMBLY UNIT FOR A VAPORIZING BURNER

(71) Applicant: Eberspächer Climate Control Systems GmbH & Co. KG, Esslingen (DE)

(72) Inventor: Walter Blaschke, Deizisau (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 148 days.

(21) Appl. No.: 15/692,217

(22) Filed: Aug. 31, 2017

(65) Prior Publication Data
US 2018/0066841 A1 Mar. 8, 2018

(30) Foreign Application Priority Data

Sep. 7, 2016 (DE) .......................... 10 2016 116 687

(51) Int. Cl.
*F23D 3/40* (2006.01)
*F24C 5/02* (2006.01)
(Continued)

(52) U.S. Cl.
CPC .............. *F23D 3/40* (2013.01); *B60H 1/2203* (2013.01); *F23C 7/008* (2013.01); *F23D 5/123* (2013.01);
(Continued)

(58) Field of Classification Search
CPC .......... F23D 3/40; F23D 5/123; F23D 11/383; F23D 2900/21002; B60H 1/2203; F23C 7/008
(Continued)

(56) References Cited

U.S. PATENT DOCUMENTS 3,849,055 A * 11/1974 Stanley ..................... F23D 5/00
431/170
4,115,050 A 9/1978 Gerwin
(Continued)

FOREIGN PATENT DOCUMENTS

CN 104566360 A 4/2015
CN 204853469 U 12/2015
(Continued)

OTHER PUBLICATIONS

"DE_2545234_A1_M—Machine Translation.pdf", machine translation, EPO.org, Mar. 27, 2019.*
(Continued)

*Primary Examiner* — Steven B McAllister
*Assistant Examiner* — Daniel E. Namay
(74) *Attorney, Agent, or Firm* — McGlew and Tuttle, P.C.

(57) ABSTRACT

A combustion chamber assembly unit, for a vaporizing burner, includes a combustion chamber housing with a circumferential wall extending in a direction of a combustion chamber housing longitudinal axis (L) and a bottom area (14), together defining a combustion chamber (16). The bottom area (14) includes an evaporating medium carrier (18) and on a side facing the combustion chamber (16), a porous evaporating medium (20). A first flame diaphragm (36), with a first diaphragm opening (38), is provided on the circumferential wall (12). A second flame diaphragm (40), with a second diaphragm opening (42), is provided at an axial distance to the first flame diaphragm (36) on an axial side facing away from the porous evaporating medium (20). An air admission opening arrangement (44) is provided in the circumferential wall (12) and includes an air admission opening (46) between the first flame diaphragm (36) and the second flame diaphragm (40).

20 Claims, 4 Drawing Sheets

(51) Int. Cl.
*F23D 11/44* (2006.01)
*F23D 11/46* (2006.01)
*F23D 5/10* (2006.01)
*F23K 5/22* (2006.01)
*B60H 1/22* (2006.01)
*F23C 7/00* (2006.01)
*F23D 5/12* (2006.01)
*F23D 11/38* (2006.01)

(52) U.S. Cl.
CPC .. *F23D 11/383* (2013.01); *F23D 2900/21002* (2013.01)

(58) Field of Classification Search
USPC .................................................. 237/12.3 C
See application file for complete search history.

(56) References Cited

U.S. PATENT DOCUMENTS

| | | | | |
|---|---|---|---|---|
| 4,230,443 | A * | 10/1980 | Berg | F02M 27/02 431/115 |
| 4,365,952 | A * | 12/1982 | Ohmukai | F23D 3/40 239/138 |
| 4,421,476 | A * | 12/1983 | Gulden | F02M 27/02 239/132.3 |
| 5,000,004 | A * | 3/1991 | Yamanaka | F23C 13/00 431/7 |
| 5,020,991 | A * | 6/1991 | Schaale | F23D 3/40 126/110 B |
| 5,056,501 | A * | 10/1991 | Ida | B60H 1/2212 126/110 B |
| 5,062,788 | A * | 11/1991 | Best | F23D 14/34 431/10 |
| 5,197,871 | A * | 3/1993 | Yamamoto | F23D 3/40 126/110 B |
| 5,253,806 | A | 10/1993 | Gaysert et al. | |
| 5,439,372 | A * | 8/1995 | Duret | F23D 14/02 431/2 |
| 5,441,402 | A * | 8/1995 | Reuther | F23D 14/02 431/328 |
| 5,641,282 | A * | 6/1997 | Lee | F23D 14/16 126/91 A |
| 5,658,139 | A * | 8/1997 | Flanagan | F23D 14/26 431/328 |
| 5,707,227 | A | 1/1998 | Langen et al. | |
| 5,938,427 | A * | 8/1999 | Suzuki | F23C 6/04 431/11 |
| 5,993,192 | A * | 11/1999 | Schmidt | F23D 14/18 431/12 |
| 6,027,334 | A * | 2/2000 | Blaschke | F01N 3/0256 126/116 R |
| 6,213,406 | B1 | 4/2001 | Kenzi et al. | |
| 6,431,857 | B1 * | 8/2002 | Charmes | F23D 14/18 431/326 |
| 6,761,558 | B1 * | 7/2004 | Kim | F23D 14/125 431/4 |
| 6,991,454 | B2 * | 1/2006 | Gore | F23D 14/16 126/92 R |
| 7,157,066 | B2 * | 1/2007 | Diener | B82Y 30/00 423/445 B |
| 7,578,669 | B2 * | 8/2009 | Liu | F23C 13/06 122/367.1 |
| 9,857,081 | B2 * | 1/2018 | Collmer | B60H 1/2212 |
| 9,863,640 | B2 * | 1/2018 | Pfister | B60H 1/2203 |
| 2001/0035463 | A1 * | 11/2001 | Takagi | F23D 3/40 237/12 |
| 2002/0132205 | A1 * | 9/2002 | Gore | F23D 14/16 431/328 |
| 2003/0022118 | A1 * | 1/2003 | Suzuki | F23C 13/02 431/243 |
| 2003/0027090 | A1 * | 2/2003 | Blaschke | B01B 81/005 431/243 |
| 2003/0196381 | A1 * | 10/2003 | Eberspach | B01B 1/005 48/197 FM |
| 2004/0173692 | A1 * | 9/2004 | Blaschke | B01B 1/005 237/12.3 C |
| 2005/0136305 | A1 * | 6/2005 | Eberspach | F23D 3/40 429/435 |
| 2005/0235654 | A1 * | 10/2005 | Kaupert | B01B 1/005 62/50.2 |
| 2007/0273052 | A1 * | 11/2007 | Schmidt | F23D 3/22 261/101 |
| 2008/0124666 | A1 * | 5/2008 | Stocker | F23C 99/006 431/7 |
| 2008/0134580 | A1 * | 6/2008 | Kah | B01B 1/005 48/197 FM |
| 2008/0141675 | A1 * | 6/2008 | Liu | F23C 13/06 60/777 |
| 2014/0000551 | A1 * | 1/2014 | Eberspach | F02B 19/00 123/253 |
| 2014/0193759 | A1 * | 7/2014 | Weber | F23C 7/06 431/314 |
| 2014/0234792 | A1 * | 8/2014 | Brehmer | F23D 3/40 431/329 |
| 2014/0346242 | A1 * | 11/2014 | Jozinovic | F23C 7/004 237/32 |
| 2015/0102115 | A1 * | 4/2015 | Collmer | B60H 1/2212 237/12.3 C |
| 2015/0102116 | A1 * | 4/2015 | Pfister | B60H 1/2203 237/12.3 C |
| 2015/0102117 | A1 * | 4/2015 | Collmer | B60H 1/2203 237/12.3 C |
| 2018/0094806 | A1 * | 4/2018 | Kido | F23Q 7/08 |

FOREIGN PATENT DOCUMENTS

| | | | |
|---|---|---|---|
| DE | 25 45 234 A1 | 4/1977 | |
| DE | 3914611 A1 * | 12/1989 | F23D 3/40 |
| DE | 3914611 A1 | 12/1989 | |
| DE | 41 41 367 C1 | 3/1993 | |
| DE | 42 18 629 A1 | 12/1993 | |
| DE | 4401799 C1 * | 6/1995 | F23D 3/40 |
| DE | 102005004359 A1 * | 8/2006 | F23D 3/40 |
| DE | 102005032980 A1 * | 1/2007 | F23D 3/40 |
| DE | 10 2013 220 654 A1 | 4/2015 | |
| EP | 1696175 A1 | 8/2006 | |
| EP | 1744100 A2 * | 1/2007 | F23D 3/40 |
| EP | 1970624 A2 * | 9/2008 | F23D 3/40 |
| JP | 55079907 A * | 6/1980 | |
| JP | 02033522 A * | 2/1990 | F23D 3/40 |
| JP | 04064802 A * | 2/1992 | |
| JP | 2003021322 A * | 1/2003 | |
| RU | 2310128 C1 | 11/2007 | |
| RU | 2580751 C1 | 4/2016 | |
| SU | 882423 A3 | 11/1981 | |
| WO | WO-9506223 A1 * | 3/1995 | B60H 1/2203 |
| WO | WO-9506224 A1 * | 3/1995 | F23D 3/40 |
| WO | WO-2006074622 A1 * | 7/2006 | B01B 1/005 |

OTHER PUBLICATIONS

"DE_4218629_A1_M—Machine Translation.pdf", machine translation, EPO.org, Mar. 27, 2019.*
"EP_1696175_A1_M—Machine Translation.pdf", machine translation, EPO.org, Mar. 27, 2019.*

* cited by examiner

COMBUSTION CHAMBER ASSEMBLY UNIT FOR A VAPORIZING BURNER

CROSS REFERENCE TO RELATED APPLICATIONS

This application claims the benefit of priority under 35 U.S.C. § 119 of German Application 10 2016 116 687.1 filed Sep. 7, 2016, the entire contents of which are incorporated herein by reference.

FIELD OF THE INVENTION

The present invention pertains to a combustion chamber assembly unit for a vaporizing burner that can be used, for example, in a vehicle heater, which can be operated as a parking heater or/and as an auxiliary heater.

BACKGROUND OF THE INVENTION

Such a combustion chamber assembly unit is known from DE 10 2013 220 654 A1. This combustion chamber assembly unit comprises a combustion chamber housing with an essentially cylindrical circumferential wall extending in the direction of a combustion chamber housing longitudinal axis and with a bottom area fixed at an axial end area of the circumferential wall. The circumferential wall and the bottom area define a combustion chamber, into which fuel is admitted via a porous evaporating medium carried on an evaporating medium carrier of the bottom area. The combustion air needed for combustion is fed via an air admission opening arrangement, which comprises a plurality of air admission openings arranged distributed in the axial direction and in the circumferential direction in an axial area of the circumferential wall between the porous evaporating medium and a flame diaphragm carried on the circumferential wall. An electrically energizable heating device is provided at the bottom area for supporting the fuel evaporation from the porous evaporating medium especially in a start phase of the combustion operation. The electrically energizable heating device is positioned on a side of the evaporating medium carrier facing away from the porous evaporating medium and thus also away from the combustion chamber. An electrically energizable ignition element extending into the combustion chamber at a short distance to the surface of the porous evaporating medium facing the combustion chamber and essentially parallel to this surface is carried on the circumferential wall.

SUMMARY OF THE INVENTION

An object of the present invention is to provide a combustion chamber assembly unit for a combustion chamber, especially for a vehicle heater, which leads to a reduced emission of nitrogen oxide during the combustion operation.

According to the present invention, this object is accomplished by a combustion chamber assembly unit for a vaporizing burner, especially for a vehicle heater, comprising a combustion chamber housing with a circumferential wall extending in the direction of a combustion chamber housing longitudinal axis and with a bottom area defining, together with the circumferential wall, a combustion chamber, wherein the bottom area comprises an evaporating medium carrier and porous evaporating medium on a side of the evaporating medium carrier facing the combustion chamber, wherein a first flame diaphragm with a first diaphragm opening is provided on the circumferential wall, and wherein an air admission opening arrangement is provided in the circumferential wall.

Provisions are further made here for a second flame diaphragm with a second diaphragm opening to be provided at an axial distance to the first flame diaphragm on the axial side of the first flame diaphragm facing away from the porous evaporating medium, and for the air admission opening arrangement to comprise at least one air admission opening between the first flame diaphragm and the second flame diaphragm By providing the air admission opening arrangement in an area of the circumferential wall, which is axially further downstream, i.e., lying at a distance from the porous evaporating medium, between the two flame diaphragms, the possibility is given to markedly lower the emission of nitrogen oxide (NOx) also by means of swirling admission of the combustion air in conjunction with exhaust gas recirculation generated in this area in the combustion process.

The mixing can be supported especially in the start phase of the combustion operation and thus the emission of harmful substances can also be reduced by the bottom area comprising an electrically energizable heating device on a side of the evaporating medium facing away from the combustion chamber.

An efficient turbulent flow can be provided by the air admission opening arrangement being configured for admitting air with a circumferential flow direction component.

Further, the generation of defined flow conditions during the admission of the combustion air can be supported by no air admission opening being provided in the circumferential wall in an axial area between the porous evaporating medium and the first flame diaphragm. The air admission opening arrangement thus preferably comprises air admission openings only in the axial area between the two flame diaphragms.

The providing of the air admission opening arrangement such that at least one, preferably each air admission opening has an opening surface normal oriented essentially at right angles to a radial line also supports the generation of a turbulent flow.

In order to be able to provide uniform flow conditions distributed over the circumference in case of a comparatively low flow resistance, it is proposed that a plurality of air admission openings be provided following one another in the circumferential direction. The feed of combustion air can take place here, for example, by an air feed chamber enclosing the circumferential wall being in connection with the combustion chamber via the air admission openings. The air feed chamber may in turn be in connection with a blower, for example, a side-channel blower, which acts as a combustion air feed device.

It is proposed in an alternative embodiment that an air feed duct is open towards the combustion chamber via an air admission opening.

In order to be able to provide a defined flow direction for the combustion air to be admitted into the combustion chamber already when flowing towards the air admission openings, it is proposed that an air routing surface, which routes the air to be admitted into the combustion chamber in the direction towards the associated air admission opening, be provided in association with at least one, preferably each air admission opening. In this case, for example, the air routing surface may route air essentially in the circumferential direction in the direction towards the associated air admission opening.

In order to achieve the flow of the combustion air into the combustion chamber in an area as far radially outward as possible, it is proposed that the air routing surface be arranged radially within the air stream routed by this air routing surface.

A variation of the flow direction, especially of the radial area as well, in which the combustion air enters the combustion chamber, can be provided by at least one air routing surface being variable in its radial positioning. For this, provisions may be made, for example, for at least one air routing surface, variable in its radial positioning, having a discharge edge variable in its radial positioning. In particular, at least one air routing surface variable in its radial positioning can be prestressed in a direction radially outwards or/and in a direction of reducing the opening cross-sectional surface of the associated air admission opening. By changing the air pressure, for example, caused by a changed feed rate of a combustion air feed device, an influence on the radial positioning of such an air routing surface can thus be obtained.

In order to be able to achieve a structural separation of the porous evaporating medium from the electrically energizable heating device associated with same, on the one hand, but to guarantee an efficient heating, on the other hand, it is proposed that the electrically energizable heating device be provided on a side of the evaporating medium carrier facing away from the combustion chamber.

Further, an electrically energizable ignition element for starting the combustion may be provided in the axial area between the porous evaporating medium and the first flame diaphragm, whereby the electrically energizable ignition element preferably extends into the combustion chamber starting from the circumferential wall.

The feeding back of combustion exhaust gases in the combustion process can further be supported by the circumferential wall, preferably starting from the second flame diaphragm, being configured as expanding radially in a direction away from the bottom area.

The present invention further pertains to a vehicle heater, comprising a combustion chamber assembly unit configured according to the present invention, further comprising a combustion air feed device for feeding combustion air to the combustion chamber via the air admission opening arrangement as well as a fuel feed device for feeding fuel to the combustion chamber via the porous evaporating medium.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
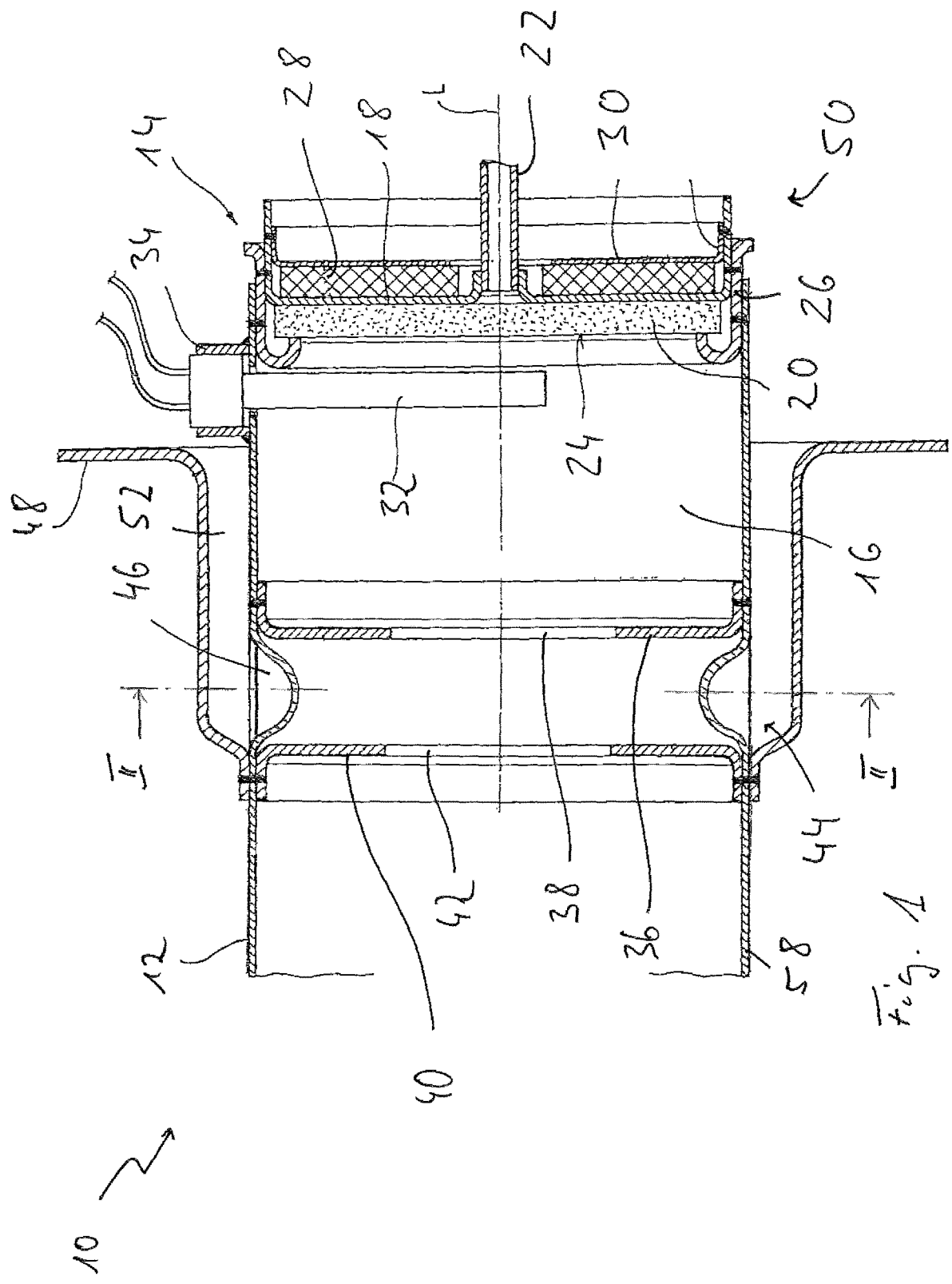
FIG. 1 is a partial longitudinal sectional view of a combustion chamber assembly unit for a vaporizing burner of a vehicle heater, cut along a line I-I in FIG. 2.

Referring to the drawings, a combustion chamber assembly unit, shown in a longitudinal section, is generally designated by 10 in FIG. 1. The combustion chamber assembly unit 10 comprises a circumferential wall 12, which is made, for example, of sheet metal material, is essentially cylindrical and extends in the direction of a combustion chamber housing longitudinal axis L, and a bottom area 14 at an axial end area of same. The bottom area 14, together with the circumferential wall 12, defines a combustion chamber, which is generally designated by 16.

The bottom area 14 comprises an evaporating medium carrier 18, which is, for example, likewise made of sheet metal material. A single-layer or multilayer porous evaporating medium 20, for example, mesh, knitted fabric, non-woven fabric, foamed ceramic or the like, is provided on a side of the evaporating medium carrier 18 facing the combustion chamber 16. Fuel, which is fed by a fuel feed device 70, for example, a feed pump, is fed into the porous evaporating medium 20 via a fuel feed line 22 discharging into the evaporating medium carrier 18. The liquid fuel, which is distributed in the porous evaporating medium due to capillary feed action and also due to the effect of gravity, is evaporated to the combustion chamber 16 on a surface 24 facing the combustion chamber 16. The porous evaporating medium 20 is held in its radially outer area fixed on the evaporating medium carrier 18 by a ring-like carrier 26. The bottom area 14 can be fixed to the circumferential wall 12, for example, in the area of the ring-like carrier 26. It should be pointed out that based on the fact that the different components used are preferably made of sheet metal material, the connection to one another can generally be carried out by welding, especially laser welding.

An electrically energizable heating device 28, which is shown only in principle, is provided on a rear side of the evaporating medium carrier 18 facing away from the combustion chamber. This heating device 28 may comprise one or more heating coils or heat conductor sections extending on the rear side of the evaporating medium carrier 18, which heat the evaporating medium carrier 18 and via same the porous evaporating medium 20 upon electrical energization. The electrically energizable heating device 28 may be fixed to the evaporating medium carrier by a retaining element 30, which is, for example, likewise made of sheet metal material.

An ignition element, generally designated by 32, is carried on the circumferential wall 12 at a short distance to the surface 24 of the porous evaporating medium 20 via a connection piece 34 fixed to the circumferential wall 12. The ignition element 32, which may be configured, for example, as a glow-type ignition pin, extends into the combustion chamber 16 essentially parallel to the surface 24 of the porous evaporating medium 20. When the ignition element 32 is electrically energized, the mixture of fuel vapor formed in the surrounding area thereof and combustion air to be admitted into the combustion chamber 16 is ignited and thus the combustion is started.

A first flame diaphragm 36 with a first diaphragm opening 38 formed centrally therein is provided on the circumferential wall 12 at an axial distance to the porous evaporating medium 20 or even to the ignition element 32. A second flame diaphragm 40 with a second diaphragm opening 42 formed centrally therein is carried on the circumferential wall 12 at an axial distance to the first flame diaphragm 36 or on the axial side of same facing away from the porous evaporating medium 20. An air admission opening arrangement, generally designated by 44, is provided axially between the two flame diaphragms 36, 40. This air admission opening arrangement 44 comprises a plurality of air admission openings 46 following one another in the circumferential direction about the combustion chamber housing longitudinal axis L. No air admission openings are provided in the axial area of the circumferential wall 12, which lies between the bottom area 14 and the first flame diaphragm 36.

Figure 2:
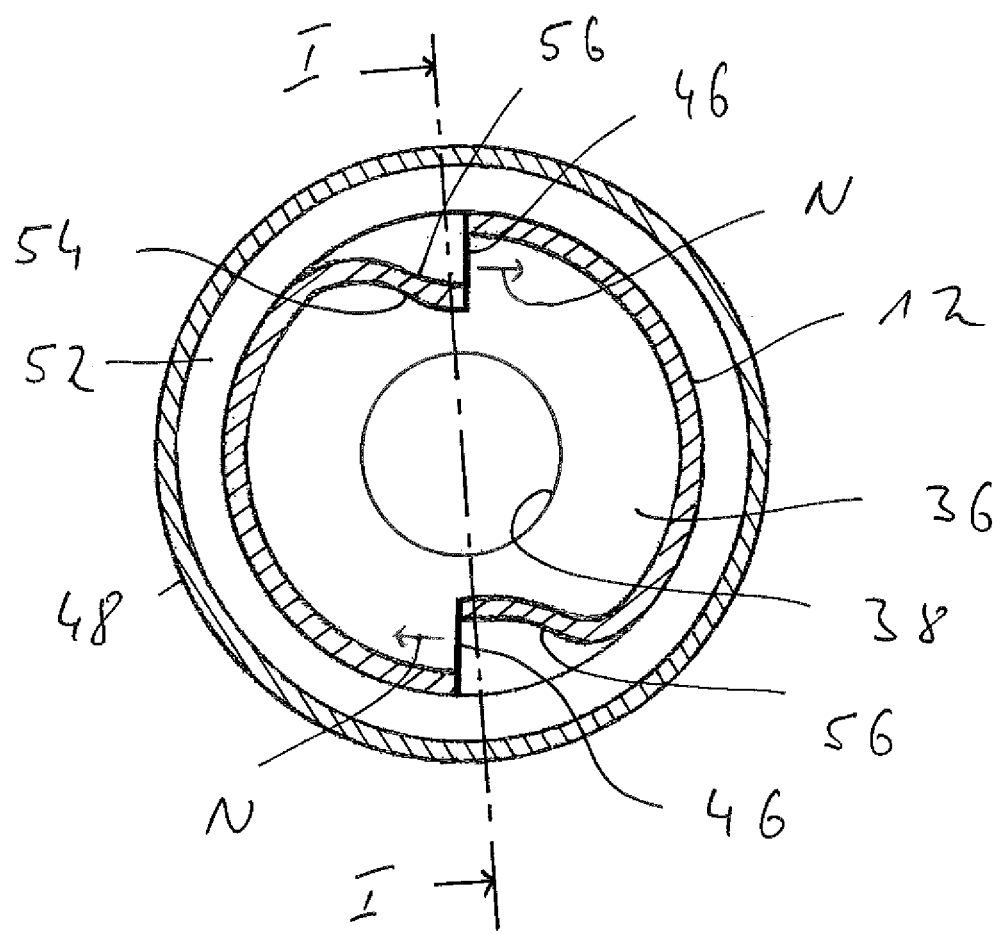
FIG. 2 is a cross-sectional view of the combustion chamber assembly unit of FIG. 1, cut along a line II-II in FIG. 1.

A combustion chamber housing carrier element 48 encloses the circumferential wall 12 radially on the outside. Combustion chamber housing 50 of the combustion chamber assembly unit 10, essentially comprising the circumferential wall 12 and the bottom area 14, is carried via the carrier element 48 on a heater component. The carrier element 48 together with the circumferential wall 12, defines an air feed chamber 52 enclosing this circumferential wall 12 in a ring-like manner. The air fed by an air feed device 80, for example, a side-channel blower (schematically indicated with the embodiment of FIG. 3), is fed in the direction towards the combustion chamber 16 via the air feed chamber 52. The air flowing through the air feed chamber 52 enters the combustion chamber 16 in the area of the air admission openings 46. As can be seen in FIG. 2, the air admission opening arrangement 44 comprises two air admission openings 46 arranged at a circumferential distance to one another. Of course, more than two air admission openings, which could be arranged preferably at uniform circumferential distances, may also be provided.

The air admission openings 46 are formed in the area of corresponding gill-like bulges 54 on the circumferential wall 12. An air routing surface 56, formed by deforming radially inwards, routes the air flowing forwards into the combustion chamber 16 via the air feed chamber 52 essentially with flow direction in the circumferential direction or tangentially. In this case, the air admission openings 46 preferably have each an opening surface normal N, which is essentially at right angles to a radial line in relation to the combustion chamber housing longitudinal axis L.

An efficient turbulent flow of the air admitted into the combustion chamber 16 is generated in an axially defined area due to the configuration of the air admission opening arrangement 44 with its air admission openings 46 admitting the air essentially in the circumferential direction and the positioning of these air admission openings 46 axially between the two flame diaphragms 36, 40. This turbulent flow results, on the one hand, in an efficient mixing with the fuel vapor discharged by the porous evaporating medium 20. On the other hand, this turbulent flow about the combustion chamber housing longitudinal axis L results in a part of the exhaust gases leaving the combustion chamber 16 via the second diaphragm opening 42 in a direction towards a flame tube 58 likewise provided by the circumferential wall 12 being again fed back into the combustion chamber 16 in the combustion process by swirling with the air admitted between the two flame diaphragms 36, 40. This leads to a substantial reduction in the nitrogen acid content in the combustion exhaust gases forming in the combustion chamber 16 during the combustion.

The percentage of the exhaust gases fed back into the combustion process can be influenced by the selection of the dimensioning of the two diaphragm openings 38, 42. The larger the first diaphragm opening 42 is in relation to the first diaphragm opening 38, the higher is the content of the air fed via the air admission openings 46 not in the direction towards the combustion chamber 16 or towards the porous evaporating medium 20, but rather routed directly in the direction towards the flame tube 58. If the first diaphragm opening 38 is larger in relation to the second diaphragm opening 42, the content of combustion air routed via the air admission openings 46 in the view of FIG. 1 on the right-hand side in the direction towards the porous evaporating medium 20 and not in the direction towards the flame tube 58 and thus also the content of exhaust gases carried along by the combustion air in the direction of the combustion chamber 16 are correspondingly higher.

Figure 3:
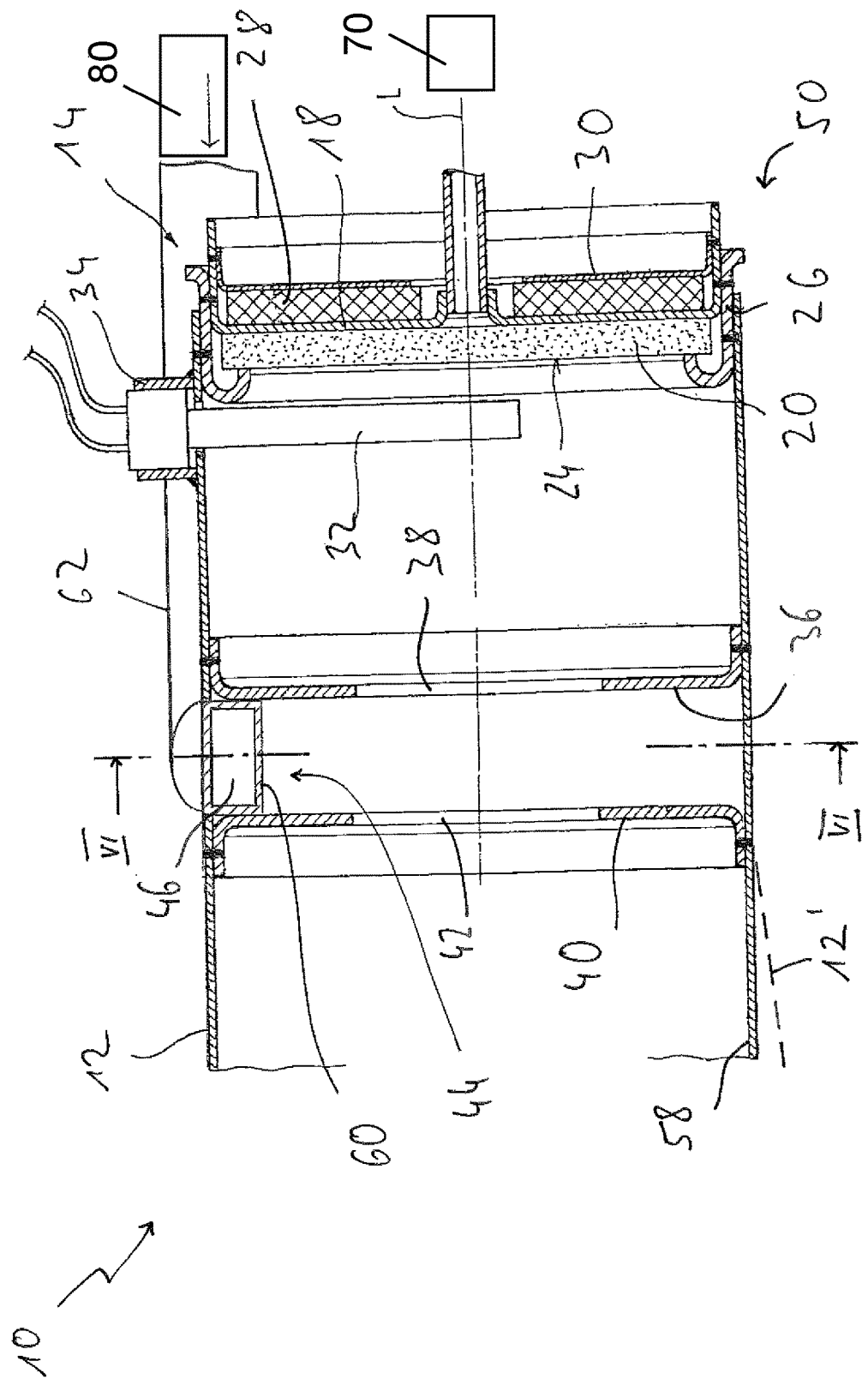
FIG. 3 is a view corresponding to FIG. 1 of an alternative embodiment of a combustion chamber assembly unit, cut along a line III-III in FIG. 4.
Figure 4:
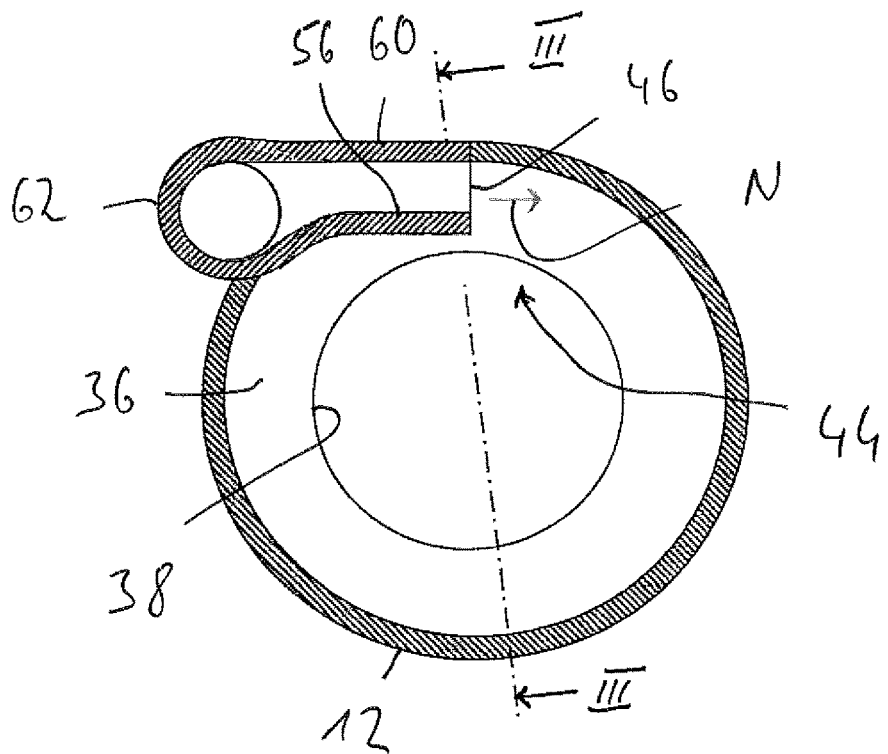
FIG. 4 is a cross-sectional view of the combustion chamber assembly unit of FIG. 3, cut along a line IV-IV in FIG. 3.

FIGS. 3 and 4 show a modified embodiment of a combustion chamber assembly unit 10. While the basic configuration of the combustion chamber assembly unit 10 with the circumferential wall 12 and with the bottom area 14 corresponds to the one described above and provided that reference is made to the explanations in this regard, the combustion air is admitted only in a single circumferential area between the two flame diaphragms 36, 40 in this configuration. For this purpose, a shaft-like air admission body 60, which essentially discharges into the circumferential wall 12 tangentially or in the circumferential direction, is provided, at the end of which an air admission opening 46 is formed with the opening normal N being essentially at right angles to a radial direction. The air admission body 60 is provided at the end of an air feed pipe 62 extending essentially in the direction of the combustion chamber housing longitudinal axis L, via which the air fed by a combustion air feed device 80 flows forward. A volume area used for the air feed and enclosing the circumferential wall 12 in a ring-like manner, as it is provided in the form of the air feed chamber 52 in the embodiment according to FIG. 1, is not present in this embodiment of FIG. 3.

Even though an efficient swirling and thus a feeding back of combustion exhaust gases generated by this swirling can likewise be achieved in the combustion process due to air admitted essentially in the circumferential direction or tangentially in the space area between the two flame diaphragms 36, 40 in the embodiment shown in FIGS. 3 and 4, a better separation of the combustion chamber 16 from the volume area used for the air feed is achieved in this embodiment. As a result, in case of a false start when fuel is fed in, but ignition does not take place, the risk that fuel can reach the area of the combustion air feed device or even the outside via the air admission opening arrangement 44 is markedly reduced.

Figure 5:
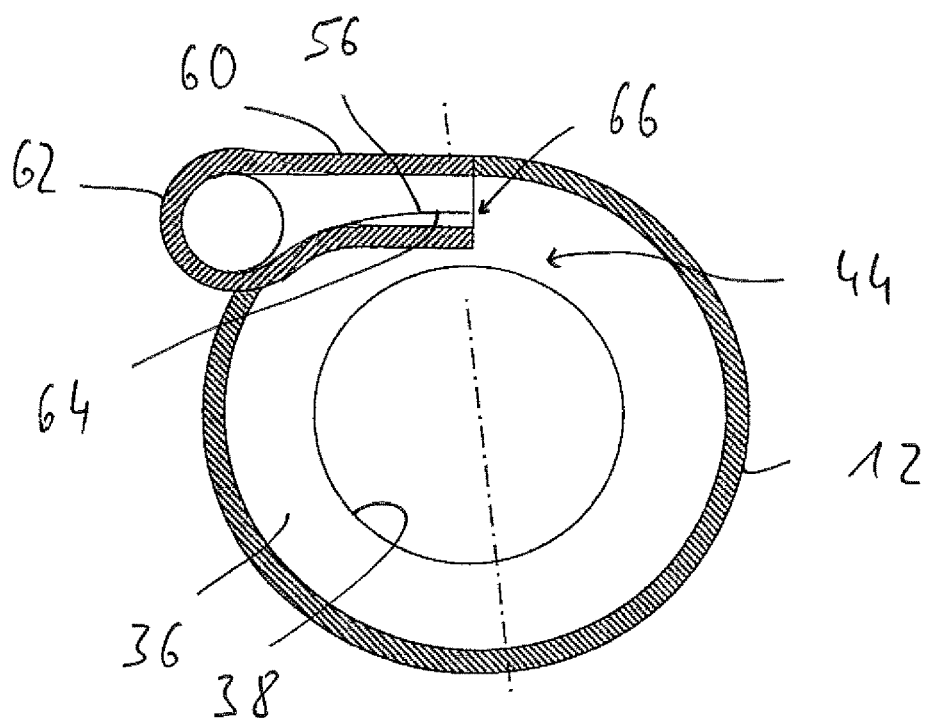
FIG. 5 is an alternative embodiment of an area, shown in FIG. 4, of an air admission opening arrangement.

FIG. 5 shows another variation of a combustion chamber assembly unit. In this embodiment, an air routing surface 56 routing the air to be fed in the direction towards the combustion chamber 46 in association with the air admission opening 46 essentially in the circumferential direction in the direction towards the air admission opening 46 is not provided directly on the air admission body 60, but rather on an air routing element made, for example, of spring steel. This [air routing element] has, for example, a discharge edge 66, which can be displaced radially because of the elasticity, in the area of the air admission opening 46. In its other circumferential end area, the air routing element 64 can be fixed to the air admission body 60.

In the unloaded, relaxed state, the air routing element 64 is moved to the maximum extent radially outwards, so that the discharge edge 66 also has a maximum distance to the combustion chamber housing longitudinal axis L. With increasing air pressure or increasing feed rate, the air stream routed in the direction towards the air admission opening 46 presses the air routing element 64 radially inwards, so that the discharge edge 66 is likewise displaced radially inwards or the opening cross section released for the admission of air increases in a direction radially inwards. Since the number of twists is inversely proportional to the mean active radius of the site of the air admission in such turbulent flow systems, the number of twists and thus also the feedback characteristic for the combustion exhaust gases leaving the combustion chamber can be influenced correspondingly by influencing the radial position of the discharge edge 66.

Another influence on the feedback characteristic can be achieved, as suggested in FIG. 3, by the circumferential wall 12' being configured as expanding radially, for example, starting from the second flame diaphragm 40. For example, a cone-like expansion with an opening angle in the range of 8° in relation to the circumferential wall 12, which has a cylindrical configuration, can be provided here. The flame tube 58 is thus configured as a diffuser, which supports the internal feedback of combustion exhaust gases.

Finally, it should be pointed out that the configuration concepts described above may be combined with one another as well. Thus, an air routing element 64, which is variable in its radial positioning, could be provided in association with one or more air admission openings 46 shown in FIG. 1. In the embodiment of the combustion chamber assembly unit shown in FIG. 1, the circumferential wall 12 could also be configured as expanding radially like a diffuser, for example, in the area, in which it also provides the flame tube 58.

While specific embodiments of the invention have been shown and described in detail to illustrate the application of the principles of the invention, it will be understood that the invention may be embodied otherwise without departing from such principles.

What is claimed is:

1. A combustion chamber assembly unit for a vaporizing burner, the combustion chamber assembly unit comprising:
   a combustion chamber housing comprising a circumferential wall extending in a direction of a combustion chamber housing longitudinal axis and a bottom area, the bottom area and the circumferential wall together defining a combustion chamber, wherein the bottom area comprises an evaporating medium carrier and porous evaporating medium on a side of the evaporating medium carrier facing the combustion chamber;
   a first flame diaphragm with a first diaphragm opening, the first flame diaphragm being connected to the circumferential wall;
   a second flame diaphragm with a second diaphragm opening the second flame diaphragm being connected to the circumferential wall and being disposed at an axial distance to the first flame diaphragm and on an axial side of the first flame diaphragm facing away from the porous evaporating medium; and
   an air admission opening arrangement provided in the circumferential wall, the air admission opening arrangement comprising at least one air admission opening between the first flame diaphragm and the second flame diaphragm, wherein no air admission opening is provided in the circumferential wall in an axial area between the porous evaporating medium and the first flame diaphragm.

2. A combustion chamber assembly unit in accordance with claim 1, wherein the bottom area further comprises an electrically energizable heating device, on a side of the porous evaporating medium facing away from the combustion chamber.

3. A combustion chamber assembly unit in accordance with claim 1, wherein the air admission opening arrangement is configured for admitting air with a circumferential flow direction component.

4. A combustion chamber assembly unit in accordance with claim 1, wherein the at least one air admission opening has an opening surface normal oriented essentially at right angles to a radial direction relative to the direction of the combustion chamber housing longitudinal axis.

5. A combustion chamber assembly unit in accordance with claim 1, wherein the air admission opening arrangement comprises additional air admission openings to provide a plurality of air admission openings following one another in a circumferential direction.

6. A combustion chamber assembly unit in accordance with claim 5, further comprising an air feed chamber enclosing the circumferential wall, the air feed chamber being connected with the combustion chamber via the air admission openings.

7. A combustion chamber assembly unit in accordance with claim 1, further comprising an air feed duct open to the combustion chamber via the at least one air admission opening.

8. A combustion chamber assembly unit in accordance with claim 1, wherein an air routing surface routes air to be admitted into the combustion chamber in a direction towards the at least one air admission opening.

9. A combustion chamber assembly unit in accordance with claim 8, wherein the air routing surface routes air essentially in a circumferential direction.

10. A combustion chamber assembly unit in accordance with claim 8, wherein the air routing surface is arranged radially within an air stream routed by the air routing surface.

11. A combustion chamber assembly unit in accordance claim 8, wherein the air routing surface has a variable radial position.

12. A combustion chamber assembly unit in accordance with claim 11, wherein the air routing surface has a discharge edge that has a variable radial position.

13. A combustion chamber assembly unit in accordance with claim 11, wherein the air routing surface is prestressed in a radially outward direction or is prestressed in a direction in which the opening cross-sectional surface of the associated air admission opening is reduced or is prestressed in a radially outward direction and is prestressed in a direction in which the opening cross-sectional surface of the associated air admission opening is reduced.

14. A combustion chamber assembly unit in accordance with claim 1, further comprising an electrically energizable heating device on a side of the evaporating medium carrier facing away from the combustion chamber or an electrically energizable ignition element provided in an axial area between the porous evaporating medium and the first flame diaphragm, wherein the electrically energizable ignition element extends into the combustion chamber starting from the circumferential wall.

15. A combustion chamber assembly unit in accordance with claim 1, wherein the circumferential wall is configured expanding in a direction radially away from the bottom area, starting from the second flame diaphragm.

16. A vehicle heater comprising:

a combustion chamber assembly unit comprising:
- a combustion chamber housing comprising a circumferential wall extending in a direction of a combustion chamber housing longitudinal axis and a bottom area, the bottom area and the circumferential wall together defining a combustion chamber, wherein the bottom area comprises an evaporating medium carrier and porous evaporating medium on a side of the evaporating medium carrier facing the combustion chamber;
- a first flame diaphragm with a first diaphragm opening, the first flame diaphragm being connected to the circumferential wall;
- a second flame diaphragm with a second diaphragm opening the second flame diaphragm being connected to the circumferential wall and being disposed at an axial distance to the first flame diaphragm and on an axial side of the first flame diaphragm facing away from the porous evaporating medium; and
- an air admission opening arrangement provided in the circumferential wall, the air admission opening arrangement comprising at least one air admission opening between the first flame diaphragm and the second flame diaphragm;
- a combustion air feed device feeding combustion air to the combustion chamber via the air admission opening arrangement; and
- a fuel feed device feeding fuel to the combustion chamber via the porous evaporating medium, wherein no air admission opening is provided in the circumferential wall in an axial area between the porous evaporating medium and the first flame diaphragm.

17. A vehicle heater in accordance with claim 16, wherein the bottom area further comprises an electrically energizable heating device on a side of the porous evaporating medium facing away from the combustion chamber.

18. A vehicle heater in accordance with claim 16, wherein the air admission opening arrangement is configured for admitting air with a circumferential flow direction component.

19. A vehicle heater in accordance with claim 16, wherein the air admission opening arrangement comprises additional air admission openings to provide a plurality of air admission openings following one another in a circumferential direction and further comprising an air feed chamber enclosing the circumferential wall, the air feed chamber being connected with the combustion chamber via the air admission openings.

20. A combustion chamber assembly unit for a vaporizing burner, the combustion chamber assembly unit comprising:
- a combustion chamber housing comprising a circumferential wall extending in a direction of a combustion chamber housing longitudinal axis and a bottom area, the bottom area and the circumferential wall together defining a combustion chamber, wherein the bottom area comprises an evaporating medium carrier and porous evaporating medium on a side of the evaporating medium carrier facing the combustion chamber;
- a first flame diaphragm with a first diaphragm opening, the first flame diaphragm being connected to the circumferential wall;
- a second flame diaphragm with a second diaphragm opening the second flame diaphragm being connected to the circumferential wall and being disposed at an axial distance to the first flame diaphragm and on an axial side of the first flame diaphragm facing away from the porous evaporating medium, the circumferential wall comprising a circumferential wall portion extending between the first flame diaphragm and the second flame diaphragm and the circumferential wall comprising another circumferential wall portion extending between the porous evaporating medium and the first flame diaphragm, the another circumferential wall portion extending in an axial direction with respect to a longitudinal axis of the combustion chamber housing; and
- an air admission opening arrangement provided only in the circumferential wall portion extending between the first flame diaphragm and the second flame diaphragm, wherein no air admission opening is provided in the another circumferential wall portion extending between the porous evaporating medium and the first flame diaphragm.

\* \* \* \* \*